(12) United States Patent
Wildegger

(10) Patent No.: US 8,301,020 B2
(45) Date of Patent: Oct. 30, 2012

(54) TANK WITHDRAWAL SYSTEM WITH ELECTRIC AND FLUIDIC HEATING DEVICE

(75) Inventor: Christian Wildegger, Waldfischbach-Burgalben (DE)

(73) Assignee: DBK David + Baader GmbH, Kandel/Pfalz (DE)

( * ) Notice: Subject to any disclaimer, the term of this patent is extended or adjusted under 35 U.S.C. 154(b) by 852 days.

(21) Appl. No.: 12/354,631

(22) Filed: Jan. 15, 2009

(65) Prior Publication Data
US 2009/0183778 A1 Jul. 23, 2009

(30) Foreign Application Priority Data
Jan. 18, 2008 (DE) .......................... 10 2008 005 196

(51) Int. Cl.
*F24H 1/10* (2006.01)
(52) U.S. Cl. ......... 392/479; 392/465; 392/471; 219/205
(58) Field of Classification Search .................. 392/465, 392/471, 479
See application file for complete search history.

(56) References Cited

U.S. PATENT DOCUMENTS

| | | | | |
|---|---|---|---|---|
| 3,630,361 A * | 12/1971 | Keating | ........................... | 210/85 |
| 3,741,008 A * | 6/1973 | Casey | ........................ | 73/114.44 |
| 3,768,730 A * | 10/1973 | Campbell | ................... | 236/93 R |
| 4,237,850 A * | 12/1980 | Connor et al. | ................. | 123/557 |
| 4,286,551 A * | 9/1981 | Blitz | .......................... | 123/41.31 |
| 4,326,491 A * | 4/1982 | Burchett | ....................... | 123/557 |
| 4,395,996 A * | 8/1983 | Davis | ........................... | 123/557 |
| 4,499,886 A * | 2/1985 | Hinds | ........................... | 123/557 |
| 4,656,979 A | 4/1987 | Hogenson | | |
| 4,684,786 A * | 8/1987 | Mann et al. | .................... | 392/441 |
| 4,807,584 A * | 2/1989 | Davis | ........................... | 123/557 |
| 4,865,005 A * | 9/1989 | Griffith | ........................ | 123/546 |
| 4,926,830 A * | 5/1990 | McNelley | ...................... | 123/557 |
| 5,158,131 A * | 10/1992 | Hurner | ............................ | 165/47 |
| 5,205,250 A * | 4/1993 | Easterly et al. | ........ | 123/142.5 R |
| 5,443,053 A * | 8/1995 | Johnson | ........................ | 123/557 |
| 5,601,066 A * | 2/1997 | Qutub | ........................... | 123/541 |
| 5,611,392 A * | 3/1997 | Malecek et al. | ................ | 165/47 |
| 5,662,090 A * | 9/1997 | Ward | ............................ | 123/557 |
| 6,157,776 A * | 12/2000 | Onken | ......................... | 392/441 |
| 6,253,743 B1* | 7/2001 | Hyodo et al. | ................. | 123/520 |
| 6,839,508 B2* | 1/2005 | Biess et al. | .................... | 392/462 |
| 7,912,360 B2* | 3/2011 | Gschwind | .................... | 392/456 |

(Continued)

FOREIGN PATENT DOCUMENTS
DE 2540496 A1 3/1977
(Continued)

*Primary Examiner* — Thor Campbell
(74) *Attorney, Agent, or Firm* — Seed IP Law Group PLLC

(57) ABSTRACT

The invention relates to a tank withdrawal system for a vehicle tank filled with a frozen liquid. The tank withdrawal system comprises a heating system comprising at least one electric heating element as primary heating device and a conduit system provided with at least one withdrawal conduit with a withdrawal opening arranged in the vehicle tank. The cold start volume of the frozen liquid extending around the withdrawal opening can be melted by the primary heating device. To quickly melt a cold start volume while melting off the remaining frozen liquid consuming as minimal amount of energy, the heating system comprises a secondary heating device supplied with a heating fluid and the conduit system comprises at least one heating conduit through which the heating fluid can flow and which is arranged in the liquid in the vehicle tank.

17 Claims, 6 Drawing Sheets

U.S. PATENT DOCUMENTS

| | | |
|---|---|---|
| 2004/0025498 A1 | 2/2004 | Lambert et al. |
| 2005/0036771 A1 | 2/2005 | Bauck et al. |
| 2007/0075467 A1 | 4/2007 | Osaku et al. |
| 2007/0157602 A1* | 7/2007 | Gschwind ................ 60/274 |
| 2009/0100824 A1 | 4/2009 | Starck et al. |
| 2009/0277444 A1* | 11/2009 | Lin .............. 126/643 |

FOREIGN PATENT DOCUMENTS

| | | |
|---|---|---|
| DE | 102004062603 B3 | 7/2006 |
| DE | 102005025724 A1 | 7/2006 |
| DE | 102005037201 A1 | 2/2007 |
| DE | 102006027487 A1 | 3/2007 |
| DE | 102006048636 A1 | 4/2007 |
| DE | 102005059581 A1 | 6/2007 |
| DE | 102007047885 A1 | 6/2008 |
| DE | 102008000549 A1 | 11/2008 |
| DE | 102007041524 A1 | 3/2009 |
| EP | 1582732 A1 | 10/2005 |
| EP | 1602805 A1 | 12/2005 |
| JP | 2005248824 A | 9/2005 |
| JP | 2005291086 A | 10/2005 |
| WO | 03093080 A1 | 11/2003 |
| WO | 2005066471 A1 | 7/2005 |
| WO | 2006131201 A2 | 12/2006 |
| WO | 2009053176 A1 | 4/2009 |

* cited by examiner

TANK WITHDRAWAL SYSTEM WITH ELECTRIC AND FLUIDIC HEATING DEVICE

CROSS-REFERENCE TO RELATED APPLICATION

This application claims priority to German Patent Application No. 102008005196.9, filed Jan. 18, 2008, which application is incorporated herein by reference in its entirety.

BACKGROUND

1. Technical Field

The invention relates to a tank withdrawal system for a vehicle tank filled with a frozen liquid. The tank withdrawal system includes a heating system comprising at least one electric heating element serving as a primary heating device and includes a conduit system comprising at least one withdrawal conduit with a withdrawal opening arranged in the vehicle tank. A cold start volume of the frozen substance extending around the withdrawal opening can be melted by the electric heating element. The invention further relates to a method of withdrawing a frozen substance from a vehicle tank, wherein the frozen substance is melted in the region around at least one withdrawal opening and the molten liquid is conveyed out of the vehicle tank through the withdrawal opening.

2. Description of the Related Art

In vehicle tanks for vehicles which supply a consumer with liquid via a conduit system, a problem arises in that the liquids freeze at outside temperatures that are below the freezing point of the liquid. This problem is, for example, known with store tanks for cleansing solutions for windshield and headlight washer systems. In winter, the cleansing solution freezes at low temperatures, so that shortly after a cold start of the vehicle, no liquid cleansing solution for the washer system is available. The addition of antifreeze can lower the freezing point of the cleansing solution only to a limited degree, e.g., to approximately −20° C., so that at temperatures below −20° C. the liquid freezes in the tank and in the conduits of the washer system in spite of the antifreeze.

To reduce nitrogen oxide emissions in the waste gases of internal combustion engines, in particular diesel engines, emission control according to the SCR method (Selective Catalytic Reduction) can be carried out. In this case, an aqueous urea solution serving as a reducing agent is supplied to the exhaust gases of the internal combustion engines. The aqueous urea solution having an urea content of, for example, 32.5 weight percent freezes at a temperature below −11° C.

To avoid freezing of the stored liquids, the store tanks for the cleansing solution of washer systems or for the urea solution are equipped with heating systems which melt off the frozen liquids in the store tanks.

These heating systems are conventionally integrated in the withdrawal unit and melt off at least a cold start volume of the liquid to be withdrawn that is present around the withdrawal opening in the tank during a cold start of the vehicle.

A heating system to be used in fuel tanks to avoid precipitation of the fuel at low temperatures in diesel tanks is known, for example, from U.S. Pat. No. 4,656,979. The heating system described therein comprises a conduit system through which, for example, the coolant of the internal combustion engine is conveyed, of which the convected heat heats the fuel. The conduit system comprises two conduits extending along the tank withdrawal conduit which is followed by a conduit section at a right angle extending in parallel to the outside wall of the tank.

A heated liquid tank for a motor vehicle has a heating device that uses energy from an electrical source of energy is described in WO 03/093080 A1. The battery of the vehicle, for example, functions as electrical source of energy. The heating device, for example, is a thick film heater with an element, such as a resistor or as helical electrical resistance wire.

A heated tank withdrawal system is known from EP 1 582 732 B1. It comprises an immersed body provided with a withdrawal conduit and a heat exchanger. The conduits of the heat exchanger, through which, for example, heated coolant flows extend along the withdrawal conduit and into a heat exchanger extension that extends away from the immersed body into the interior of the tank. The tank withdrawal system can comprise an additional electric heating which additionally heats the withdrawal conduit when the coolant is still cold.

A device described in DE 10 2006 027 487 A1 utilizes the convection effect in that a sheet-like aluminum body provided with heating elements and with convection holes at the edge is arranged near the bottom of the tank. Around the convection holes, a convection flow is formed by which the heat in the already thawed medium is continuously transported upwards. The medium cools further at the top and sinks again downwards to the heating.

The disadvantage of the conventionally used tank withdrawal systems is that a relatively high amount of energy is required to melt a sufficient amount of frozen reducing agent in the tank to the operation of the SCR catalyst. Thermal energy is only transmitted to the liquid across a limited area. To melt frozen reducing agent in the tank at a greater distance from the heating unit, the reducing agent present near the heating unit must be heated to a temperature above its freezing point. This is the only way for a convection flow or heat conduction to reach more remote regions of the tank through the ice and to melt off the frozen reducing agent within an appropriate period of time.

That means, to completely melt off the tank contents, a high temperature gradient is required which heats the reducing agent altogether more than necessary. Nevertheless, the temperature of the heating unit must not be arbitrarily high, as vapor forms near the heating unit when the boiling point of the liquid to be melted or of the component of the liquid having the lowest boiling point is exceeded. The vapor bubbles formed have a thermally insulating effect and reduce the efficiency of the heating device. When aqueous urea solutions are heated to temperatures of more than 60° C., the urea may decompose, so that this temperature must not be exceeded at the heat transfer surfaces.

An aggravating factor is that melting begins directly at the heating surface, so that after the molten liquid has drained off, a layer of air can be formed around the heating unit. This layer of air also has a thermally insulating effect and can thus drastically reduce the efficiency of the heating device.

BRIEF SUMMARY

Consequently, the object underlying at least some embodiments of the invention is to provide a device which melts off a cold start volume in a vehicle tank as quickly as possible, while melting off the remaining frozen liquid consuming as little energy as possible.

According to some embodiments of the invention, this object is achieved for a tank withdrawal system of the type mentioned in the beginning in that the heating system comprises a secondary heating device supplied with a heating fluid, and the conduit system comprises at least one heating conduit through which the heating fluid can flow and which is arranged in the liquid in the vehicle tank. The heating conduit is connected to the withdrawal conduit in a liquid conveying manner and the molten liquid can be supplied as heating fluid to the heating conduit through the withdrawal conduit.

The object for the method mentioned in the beginning is achieved according to some embodiments of the invention in that at least a portion of the withdrawn liquid is conveyed through the vehicle tank via a heating conduit and/or supplied to the vehicle tank, and the vehicle tank is heated with it.

In some embodiments, substantially all of the liquid stored in the vehicle tank is heated despite a localized heating capability of the primary heating device and a heating area temperature that is only slightly above the freezing point of the liquid. A tank withdrawal system embodied according to the invention at least partially utilizes the liquid withdrawn from the vehicle tank as heating fluid to also heat more remote areas of the vehicle tank by a secondary heating device. The heat transferring surface of the primary heating device is indirectly enlarged by the secondary heating device. The excessive thermal energy generated, for example, during short-term melting of a limited cold start volume is systematically directed through the conduit system to areas of the vehicle tank more remote from the cold start volume. By utilizing the liquid stored in the vehicle tank as heat transfer medium for the tank heating, no energy is required for heating another heat transfer medium.

A tank withdrawal system according to at least some embodiments of the invention can be used for melting off and withdrawing the liquid in vehicle tanks intended for a liquid consumer, such as, for example, an SCR catalyst or a windshield and headlight washer system. It can be used to melt off an aqueous urea solution, preferably with a urea proportion of 30 to 35% by weight, or a cleansing solution for windshield and/or headlight washer systems.

A tank withdrawal system according to some embodiments of the invention permits energy efficient melting of the tank contents after a cold start and prevents freezing up of the tank contents during operation, for example as the ambient temperature falls.

The embodiments of the tank withdrawal system according to the invention can be further improved by other embodiments which are each independently advantageous alone. The individual embodiments can be combined with each other as desired.

According to a first embodiment, the heating conduit can comprise a return conduit through which the liquid that has been withdrawn before through the withdrawal conduit is returned to the vehicle tank. A return opening arranged in the vehicle tank at the end of the return conduit can be arranged at any location of the tank. For example, the return opening can be positioned in the area of the withdrawal opening of the withdrawal conduit. By transporting the liquid already heated in the area of the withdrawal opening via the return conduit to colder areas of the vehicle tank, direct heat transfer can take place. If the liquid in the tank has melted off in the region of the withdrawal and return opening to such an extent that a liquid conveying connection between the withdrawal opening and the return opening is formed, the heating conduit forms a liquid cycle together with the withdrawal conduit. The liquid sucked off from the molten area in the tank through the withdrawal opening reaches the tank again via the withdrawal conduit and the return conduit. By this liquid cycle, there is a continuous transport of thermal energy of areas heated by the primary heating device, for example the cold start volume, to colder areas of the vehicle tank.

To permit filling of the withdrawal and return conduits during an initial filling of the tank withdrawal system or after drainage of the vehicle tank, an additional filling opening can be provided at a point of the withdrawal conduit or the return conduit situated at the top. To permit an escape of the air present in the conduits during the filling operation, in one advantageous embodiment closable bleed holes or bleed valves can be positioned at the top of sections of the conduits. The closable bleed holes or bleed valves are opened during the filling operation.

In a further embodiment, the return conduit can comprise several return openings through which direct heat transfer via the heating fluid is permitted at various points of the tank volume. Due to the emission of heat of the heating fluid at the return openings, cavities filled with liquid through which the heating fluid further penetrates the frozen liquid volume are formed in the ice. Thereby, the effectiveness of the heat transfer of the secondary heating device is increased.

If a return opening is located in remote areas of the vehicle tank, it is advantageous to provide a second withdrawal conduit of which the withdrawal opening is arranged in the area of the return opening. In this way, the liquid entering the tank through the return opening only covers a short distance in the area of the liquid present in the tank not surrounded by a conduit and remains in the liquid cycle formed by the withdrawal and heating conduits. In this manner, only a small volume of the frozen liquid has to be melted off in the tank to close the liquid cycle, permitting a continuous transport of the heating fluid through the heating conduit and uniform heating of the tank contents. If several return conduits are provided, several withdrawal conduits can be correspondingly provided. If a return conduit comprises several return openings, several withdrawal openings of one or several withdrawal conduits can be correspondingly provided.

If the tank withdrawal system for example comprises two withdrawal conduits, a valve or a throttle can be provided in at least one withdrawal conduit in an advantageous embodiment. By adjusting the volume of the liquid flowing through the corresponding withdrawal conduit by means of such a valve, the ratio of the withdrawal volumes of the withdrawal conduits can be adjusted. In this manner, the path of the thawed liquid through the vehicle tank can be controlled to selectively defrost certain areas in the vehicle tank. The valve can be designed to be actuated electrically or hydraulically to permit a control of the ratio of the withdrawal volumes.

If more than one return conduit is provided, in an advantageous embodiment the tank withdrawal system can comprise valves or throttles in the return conduits to adjust or control the ratio of the return volumes of the return conduits.

In some embodiments, both ends of the heating conduit can be connected to the withdrawal conduit in a liquid conveying manner. Thereby, a closed liquid cycle is formed by the heating conduit with the withdrawal conduit. If the heating conduit of the vehicle tank is also arranged in areas at a greater distance from the withdrawal opening, even remote areas of the vehicle tank, for example a bulging with a reduced cross-section, can be provided with thermal energy. Another advantage is that the cycle formed by the withdrawal and heating conduits does not have to be produced by the liquid present in the tank. The secondary heating system can be operated without any molten area in the tank outside the cold start volume. Only the conduits have to be defrosted.

The transport of the heated liquid can be effected by natural convection as the liquid heated in the area of the withdrawal opening rises, due to its reduced density, upwards in the withdrawal conduit and thus reaches the heating conduit. A more selective and quicker heat transfer can be achieved by forced convection by providing a pump connected to the withdrawal conduit and arranged between the withdrawal opening and the heating conduit. The pump can simultaneously be used as a feed pump for the tank withdrawal of the liquid by selectively delivering the liquid to the consumer and/or to the heating conduit at desired flow rates.

A valve arranged between the withdrawal conduit and the heating conduit, which branches off the heating conduit from the withdrawal conduit, can adjust the amount of liquid from the withdrawal conduit delivered to the heating conduit. A continuously variable valve can be provided which permits an arbitrary adjustment of the amount of liquid supplied to the consumer or into the heating conduit. If the section of the withdrawal conduit leading to the consumer is closed with the valve, it is also possible to supply the heating fluid in the secondary heating device by natural convection through a liquid cycle formed by the withdrawal and heating conduits.

The division of the delivery rate of a pump arranged between the withdrawal opening and the heating conduit to the transport to the consumer or to the heating conduit can be adjusted as desired with a valve. The pump can thus supply the liquid into the heating conduit or to the consumer with a portion of its delivery rate or with its total delivery rate.

The primary heating device, which may comprise electric heating elements, can be arranged in the area of the withdrawal conduit or the withdrawal opening such that, apart from the cold start volume, it also heats the withdrawal conduit. In this case, a single heating device is capable of melting the cold start volume and defrosting the withdrawal conduit.

The power of the primary heating device is limited to avoid evaporation or decomposition of the liquid. In an advantageous embodiment, the primary heating device of the tank withdrawal system can comprise a PTC resistor heating element as electric heating element. PTC resistors, also referred to as PTC heating elements (positive temperature coefficient), only heat up to a predetermined limit temperature at which the electric resistance of the PTC element drastically increases and prevents further heating. In this manner, PTC elements are self-regulating, so that one can do without a temperature control device.

Alternatively, the primary heating device can also comprise other elements of a resistor for the generation of heat, for example resistance wires or thin film elements. To avoid exceeding a predetermined limit temperature, the heating power can be limited. In a further embodiment, a thermo regulator or an electronic control can be provided for controlling the heating power which avoids exceeding a pre-adjusted temperature in the heating element or in the liquid adjoining the heating element by reducing the heating power or switching off the heating elements.

By the provision of additional heating elements which heat withdrawal conduits situated outside and/or inside the vehicle tank, the withdrawal conduits can be defrosted independent of the heating of the cold start volume. The advantage of this embodiment is that the heating of the withdrawal conduits can be switched off after they have been defrosted.

Further heating elements which heat the return or heating conduit can quickly defrost the secondary heating device, so that the same can be already put into operation shortly after a cold start of the vehicle. These heating elements can be operated independent of the primary heating device, so that they can be switched off after the conduits have been defrosted. For simplifying the construction or reducing the number of components required for heating, the heating elements of the return or heating conduits can also be part of the primary heating device.

In some embodiments, the valve can be provided with a valve heating and/or the pump can be provided with a pump heating to accelerate the defrosting of the conduit system, in particular in case of a cold start of the vehicle. By heating the valve or the pump, damage due to ice clumps are prevented.

An electronic control of the tank withdrawal system can provide heating to avoid negative consequences of low ambient temperatures for the components arranged on an electronic board or printed circuit board, such as for example prolonged operate times or malfunctions. Heating moreover offers the advantage that undesired condensation at the electric components can be prevented by heating the components to a temperature above condensation temperature. For heating, a board heating module can be mounted on the electronic boards which heats the components to a predetermined temperature after the tank withdrawal system has been put into service.

In some embodiments, exothermic elements of the tank withdrawal system, for example the pump or the electronic control, can be arranged in direct proximity to the withdrawal or heating conduit. In this manner, the dissipated heat can be better used for heating the withdrawal or heating conduit.

The exothermic elements can be connected to the withdrawal or heating conduit by a heat bridge, i.e., an area of increased thermal conductivity, in a heat-conducting manner. The heat bridge can be achieved by the shaping of the exothermic or endothermic elements, by designing the exothermic elements for example such that they adjoin the withdrawal or return conduit. Alternatively or additionally, heat conductors of materials with higher conductivity, for example aluminum, can be provided which connect exothermic elements to the withdrawal conduit, the heating conduit or the liquid in the vehicle tank in a heat conducting manner.

If electric components, for example the electronic control, are connected to the withdrawal or return conduit in a heat conducting manner, heating elements can be simultaneously used for defrosting the withdrawal or return conduit and for heating the electric components. Thereby, the number of parts and thus the manufacturing costs of the tank withdrawal system are reduced.

To utilize the waste heat of the pump for heating the tank, the pump can be arranged within or in an indentation and/or bulging outside the vehicle tank.

To utilize the waste heat of the control electronics for heating the tank, these can also be arranged within or in an indentation and/or bulging outside the vehicle tank.

In some embodiments, the valve can also be arranged within or in an indentation and/or bulging outside the vehicle tank. Thereby, losses of heat through the valve can be prevented. Additionally, the length of the conduits used for the conduit system altogether can be shortened in this manner.

In a further embodiment, also advantageous when considered alone, parts of the withdrawal conduit and/or the heating conduit together with heating elements and further elements of the tank withdrawal system can be connected to form an assembly unit. Such an assembly unit forms a closed unit in the tank withdrawal system. An assembly unit can have a modular design with defined interfaces for the connection to the tank withdrawal system. In this manner, the assembly of the tank withdrawal system is clearly facilitated.

For example, a section of the withdrawal conduit including the withdrawal opening can be integrated into a withdrawal unit together with heating elements. To facilitate the assembly of the tank withdrawal system, the withdrawal unit can be provided with a housing which supports the elements of the withdrawal unit connected to each other and seals them from outside. The withdrawal unit can then be connected to the vehicle tank by means of its housing with a non-positive or positive fit. Supplies for liquid conveying connections can be provided at the housing to connect the section of the withdrawal conduit integrated in the withdrawal unit to further sections of the withdrawal conduit. Moreover, supplies for electrically conductive connections can be provided to connect electric heating elements to the control electronics.

In a further advantageous embodiment of a module, the same can be embodied such that it can be introduced into a mounting port of the vehicle tank at least in sections. In this manner, exothermic elements, for example a pump integrated in the module, can be arranged in the vehicle tank to utilize the heat formed for heating the liquid present in the tank. By a sealing connection between vehicle tank and module, for example a flange, the mounting port in the vehicle tank can be closed by means of the module.

In a further embodiment also advantageous when considered alone, the control electronics of the tank withdrawal system can be combined with a section of the withdrawal conduit and with heating elements in one module. In this manner, the control electronics can be at least proximate to the heating elements to avoid negative consequences of low ambient temperatures for the electric components arranged on an electronic board or a printed circuit board, such as for example prolonged operate times or malfunctions, or to prevent undesired condensation at the electric components. Moreover, the dissipated heat of the control electronics can be directly used for heating the withdrawal conduit and/or the liquid in the vehicle tank. Another advantage of this embodiment is the shorter electrically conductive lines between controller and heating elements. The cable lines having larger cross-sections required for the electrical connection of the heating elements do not have to be guided out of the module for the connection to an external controller.

If in an advantageous embodiment a section of a withdrawal conduit with withdrawal opening, control electronics and heating elements for heating the withdrawal conduit and/or the control electronics are combined in one module, the same can be employed as independent withdrawal unit with or without secondary heating device.

In further advantageous embodiments, the heating power of the tank withdrawal system can be improved in a simple manner by employing several withdrawal units in one vehicle tank. As each withdrawal unit comprises its own heating elements, the heating power applied in the vehicle tank multiplies. At the same time, the meltable cold start volume and the withdrawable flow rate are increased.

According to some embodiments, a module can comprise further elements required for the tank withdrawal. Apart from the withdrawal conduit, heating elements and control electronics, a pump and a return conduit can also be integrated in the module. Thus, a module can comprise a complete tank withdrawal system that can be mounted to a vehicle tank in one step.

In a further embodiment, a module can comprise, instead of a section of a withdrawal conduit, a section of a return conduit with a return opening. In this case, the module forms a return unit with the heating elements for heating the return conduit and/or the control electronics.

In some embodiments of the tank withdrawal system, withdrawal units and return units can have identical designs. Thus, a simple modular tank withdrawal system is provided which can be configured by the use of only one module type for withdrawal or return unit. The heating power and the delivery rate of the tank withdrawal system can be determined according to this embodiment by the number of employed withdrawal and/or return units. If, for example, a larger vehicle tank is to be heated or a larger liquid volume is to be provided within a shorter time, the heating power can be increased by the use of a larger number of withdrawal and/or return units. While by the use of more withdrawal units in particular the heating power of the primary electric heating device can be increased, by the use of more return units, the heating fluid volume and thus the heating power of the secondary heating device can be increased.

According some embodiments, one or several metal oxide semiconductor field effect transistors (MOSFET) can be used for switching the heating elements. As excessive heat development in the area of the control electronics is not desired, the heat dissipated from these transistors can be dissipated to the withdrawal or heating conduit via a heat bridge, i.e., an area of higher thermal conductivity. To improve the heat conduction of the heat dissipated by the MOSFETs into the liquid, these can be arranged in direct proximity to the liquid.

For switching various heating powers, more or less MOSFETs can be used. If, for example, low heating power is switched with one MOSFET, an increased or even doubled heating power can be switched with two MOSFETs. Several heating elements can be switched by one MOSFET. Alternatively, one heating element can be switched by one or by several MOSFETs to refine the gradation of the switched heating power.

To reduce heat losses through the liquid conduits, the conduit system can be completely arranged within the vehicle tank in an advantageous embodiment.

In some embodiments, the vehicle tank and/or the conduit system can be provided with a thermal insulation. The vehicle tank and the conduit system can be surrounded by a common thermal insulation which supplies heat losses of the conduit system to the vehicle tank.

Additionally, a swirling device can be provided which intensifies convection within the vehicle tank by swirling the heated liquid. The swirling device can in particular be arranged in the cold start volume or in the area of the return opening of the heating to transport the heated liquid from these areas of the vehicle tank to the surrounding areas.

Below, the invention will be illustrated by way of example by means of various embodiments with reference to the drawings. Here, the described embodiments only represent possible embodiments that can be modified for the respective application. Individual features that are advantageous alone can be added or omitted according to the above description of the advantageous embodiments in the respective described embodiment.

DETAILED DESCRIPTION

First, the structure of a tank withdrawal system according to the invention is described with reference to the embodiment of FIG. 1.

Figure 1:
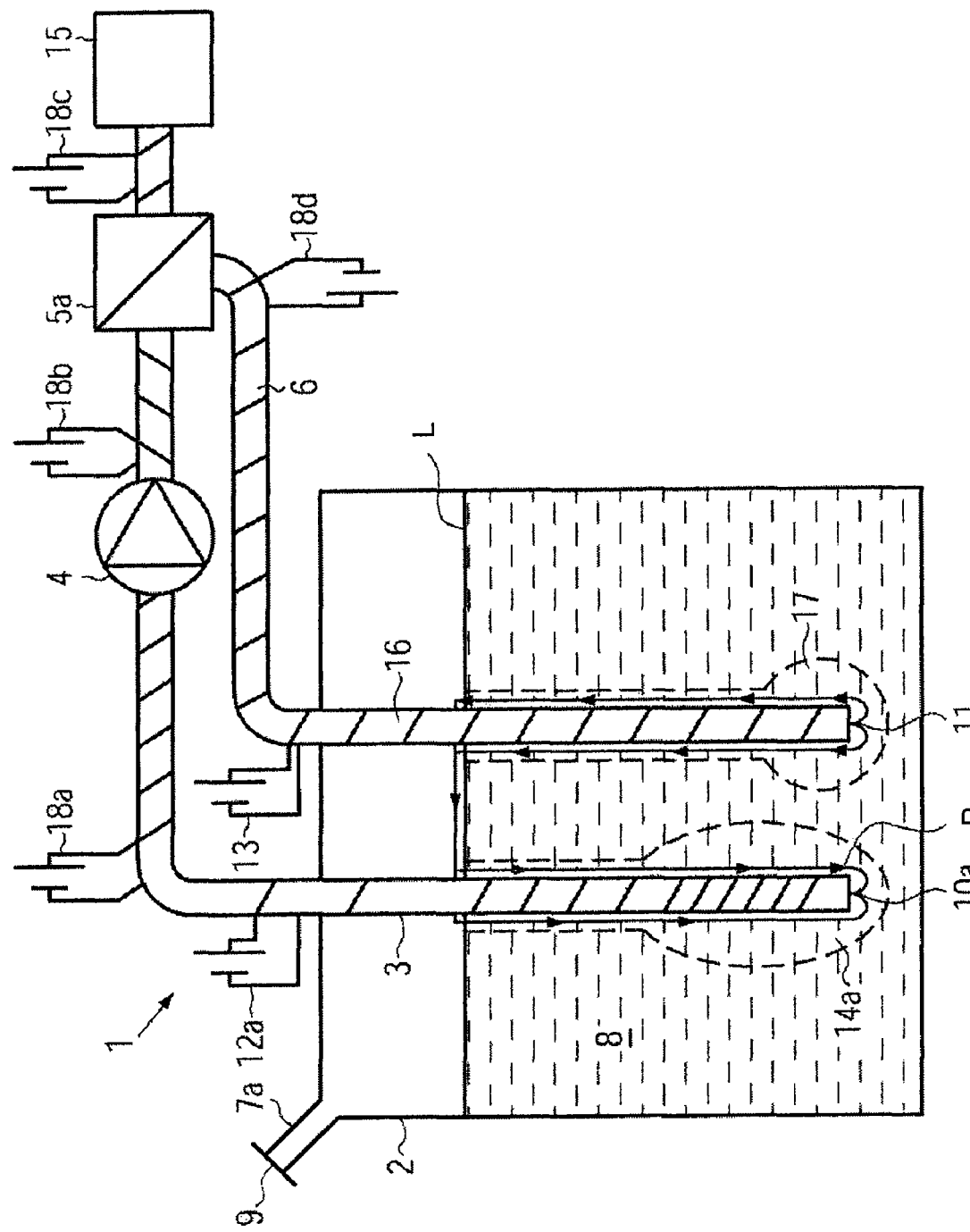
FIG. 1 shows a schematic representation of a first embodiment of the invention.

In FIG. 1, a tank withdrawal system 1 with a vehicle tank 2 is shown. The tank withdrawal system 1 comprises a withdrawal conduit 3, a pump 4, a valve 5a and a heating conduit 6. The vehicle tank 2 comprises a filler opening 7a for filling the vehicle tank 2 with a liquid 8. The filler opening 7a of the vehicle tank 2 is closed with a tank cap 9. The withdrawal conduit 3 penetrates the wall of the vehicle tank 2 and immerses into the liquid 8 stored in the vehicle tank. The withdrawal conduit 3 is provided with a withdrawal opening 10a at its end. The heating conduit 6, too, penetrates the wall of the vehicle tank 2. The heating conduit 6 comprises a return conduit 16 provided with a return opening 11 at its end as an extension immersing into the liquid contained in the vehicle tank. The tank withdrawal system 1 comprises a primary heating device 13 including a withdrawal heating 12a as well as a return heating 13.

The withdrawal heating 12a defrosts the withdrawal conduit 3 within a short time and simultaneously melts off a cold start volume 14a extending from the withdrawal opening 10a to the fluid level L. The molten liquid in the cold start volume 14a reaches the withdrawal conduit 3 through the withdrawal opening 10a and is discharged out of the vehicle tank 2 via the pump 4. Through the valve 5a, the molten liquid reaches the consumer 15. At least a portion of the liquid can be branched off into the heating conduit 6 via the valve.

The heating conduit 6 is connected to the withdrawal conduit 3 via the valve 5a in a liquid conveying manner. It comprises a return conduit 16 having a section that is immersed in the liquid 8 contained in the tank. The return conduit 16 and the return volume 17 adjoining the return conduit are defrosted within a short time by the return heating 13. The liquid transported through the return conduit 16 reaches, through the return opening 11, the vehicle tank 2 where the return volume 17 extending from the return opening 11 to the fluid level L is formed.

In case of a cold start, the withdrawal 3 and return conduits 16 are defrosted by the withdrawal heating 12a and the return heating 13. In the area of the withdrawal opening 10a, the withdrawal heating 3 additionally melts off the cold start volume 14a. After the conduits have been defrosted, the pump 4 starts and sucks the molten liquid off from the cold start volume 14a into the withdrawal conduit 3. The valve 5a at least partially branches off the liquid into the heating conduit 6. The liquid is delivered into the return volume 17 through the return opening 11. Due to the pressure built up in the return volume 17, the liquid passes along the fluid path P through the defrosted area of the return volume 17 adjoining the return conduit 16 to above the fluid level L. The liquid located on the fluid level L is sucked off by the pump 4 via the cold start volume W adjoining the fluid level L and in this way reaches again the withdrawal conduit 3. The molten liquid can in this manner circulate continuously and distribute the thermal energy absorbed in the area of the withdrawal heating 12a and the return heating 13 in the liquid 8.

The heat accumulated in the return volume 17 passes over to the surrounding frozen liquid and enlarges the volume of molten liquid. After some time, the cold start volume 14a and the return volume 17 join each other to form a cavity in the ice filled with molten liquid, the cavity closing the liquid cycle formed by the withdrawal conduit 3 and the heating conduit 6. To further uniformly heat the liquid 8, now at least one of the heating elements, for example the return heating 13, can be switched off.

In addition to the withdrawal heating 12a and the return heating 13, the primary heating device can comprise further heating elements 18a, 18b, 18c, 18d which are positioned at the external sections of the withdrawal conduit 3 and/or of the heating conduit 6. Thus, during a cold start even the external sections of the conduit system can be defrosted or kept free of ice at outside temperatures below the freezing point of the transported liquid 8.

As an alternative to separate heating elements 12a, 13, 18a, 18b, 18c, 18d, the heating elements can be joined as desired to save material or components. For example, the heating elements 18a, 18b, 18c can be heated by a common heating element, for example a continuous resistance wire arranged in parallel to the conduit sections. Alternatively or additionally to the conduits, the pump 4 and/or the valve 5a can also be provided with heating elements.

To embody the secondary heating device with a heat transferring surface as large as possible, the heating conduit 6 can extend through the tank volume in a bent manner (for example, spirally or helically) so as to increase the surface area of the heating conduit 6 and its heating capacity. Several return conduits 16 can be positioned in the vehicle tank. These return conduits can be arranged radially or in parallel. The configuration of the return conduits 16 can generally correspond to the configuration of the walls. For example, the return conduits 16 can be bent to have a similar shape as the walls (for example, angled or bent walls) of the vehicle tank 2.

Figure 2:
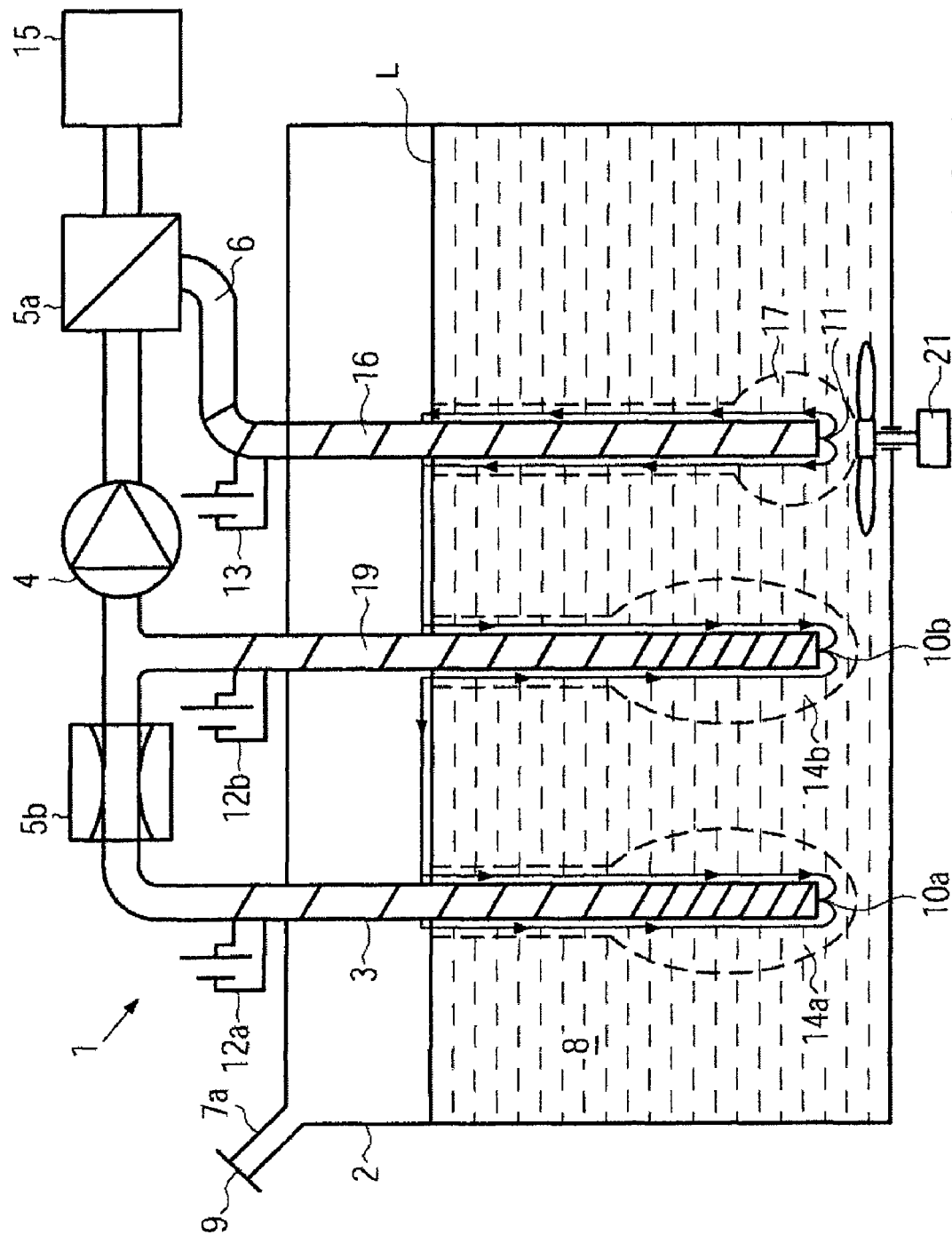
FIG. 2 shows a schematic representation of another embodiment of the invention differing from that shown in FIG. 1 by a second withdrawal conduit.

FIG. 2 shows another embodiment wherein the same reference numerals have been used for elements that correspond to the elements of the embodiment of FIG. 1 as concerns function and structure. To keep the description short, here only the differences to the embodiment of FIG. 1 are discussed.

The tank withdrawal system 1 of FIG. 2 comprises a second withdrawal conduit 19 which is provided, just as the first withdrawal conduit 3, with a withdrawal heating 12b. At the withdrawal conduit 3, a throttle 5b is provided through which the volume of the liquid flowing through the withdrawal conduit 3 can be adjusted. If the flow rate is throttled by the withdrawal conduit 3, the suction pressure at the withdrawal opening 10a is reduced, while the suction pressure at the withdrawal opening 10b is increased. In this manner, the ratio of the withdrawal volumes of the withdrawal conduits 3 and 19 can be adjusted by means of the throttle 5b. The throttle 5b can be designed to be actuated electrically or hydraulically to permit a control of the ratio of the withdrawal volumes.

In the area of the return opening 11, a swirling device 21 is adapted to swirl the liquid 8 in the return volume 17 and thus accelerates the heat transfer into the regions of the vehicle tank 2 surrounding the return volume 17. The swirling device 21 can additionally or alternatively be arranged at any arbitrary site in the tank 2, for example, in the cold start volume 14a, 14b.

The withdrawal heating 12b can be arranged such that it melts the frozen substance contained in the withdrawal conduit 19 to defrost the withdrawal conduit 19. Alternatively, it can melt a cold start volume 14b, so that after a cold start of the vehicle, the sum of the cold start volumes 14a and 14b is available to the consumer. With a generally constant cold start volume, the heating area of the withdrawal heatings 12a and 12b is in this manner distributed to two regions of the tank volume, so that with the primary heating, better heat dissipation and a larger heat transferring area can be realized.

To enlarge the heat transferring area of the primary and/or the secondary heating device, the withdrawal conduits 3, 19 can extend through the tank volume in a bent manner, for example, spirally, meandering or helically, for an enlarge heating area. In this manner, the cold start volume 14a, 14b suitable for operating the consumer 15 can be melted quickly without appreciably increasing the temperature at the heating areas of the primary heating device. Alternatively or additionally, further withdrawal conduits can be provided.

Figure 3:
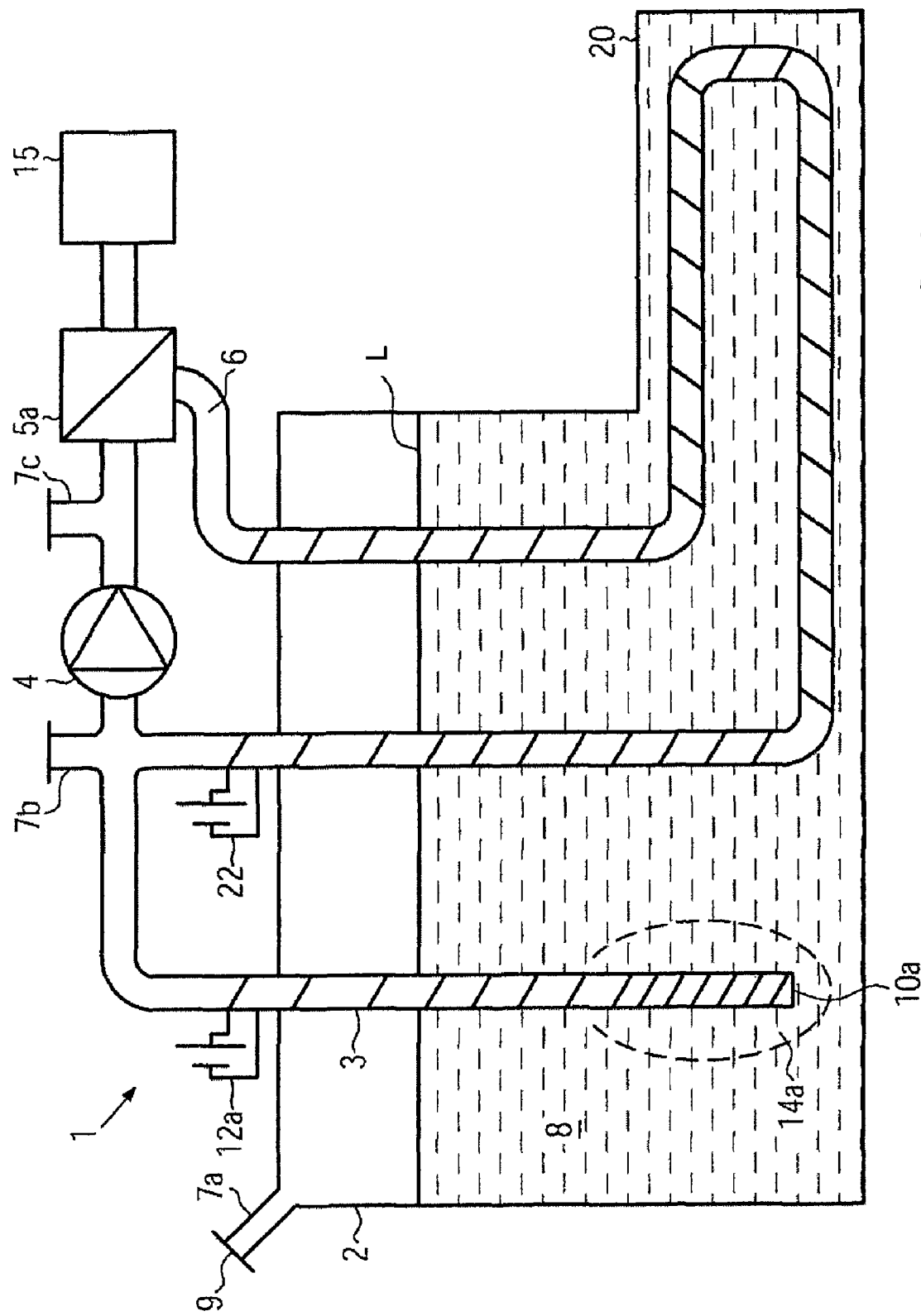
FIG. 3 shows a schematic representation of a third embodiment of the invention differing from the preceding embodiments by a heating conduit connected to the withdrawal conduit at both ends in a liquid conveying manner.

A third embodiment is shown in FIG. 3, wherein the same reference numerals have been used for elements that correspond to the embodiments of FIG. 1 or 2 as concerns their function and structure. To keep the description short, the differences to the embodiments of FIGS. 1 and 2 are discussed.

The heating conduit 6 of FIG. 3 is connected to the withdrawal conduit 3 at both ends, so that liquid transported through the heating conduit 6 partially remains in a closed return cycle. The heating conduit 6 is provided with a flow heating 22 for defrosting when the tank withdrawal system 1 is being put into operation. For heating the bulging 20 of the vehicle tank 2, the heating conduit is designed corresponding to the contour of the wall of the vehicle tank 2, so that the thermal energy of the liquid conveyed in the heating conduit also reaches remote areas of the vehicle tank 2.

At the withdrawal conduit 3, an additional filler opening 7b as well as a bleed opening 7c are arranged. After the vehicle tank 2 has been filled through the filler opening 7a, air can remain in the withdrawal conduit 3 and in the heating conduit 6. To deaerate the withdrawal and return conduits during the initial filling of the tank withdrawal system 1 or after emptying of the vehicle tank 2, liquid is introduced through the filler opening 7b. Air that is present in the withdrawal conduit 3 or the heating conduit 6, respectively, can escape by opening the bleed opening 7c in the process. Instead of the bleed opening 7c, a bleed valve 7c can be alternatively provided. To bypass the pump 4 which can bar the flow of the liquid 8 when it is switched off during the filling operation, the valve 5a connects the heating conduit 6 to the withdrawal conduit 3 during the filling of the tank withdrawal system 1.

Figure 4:
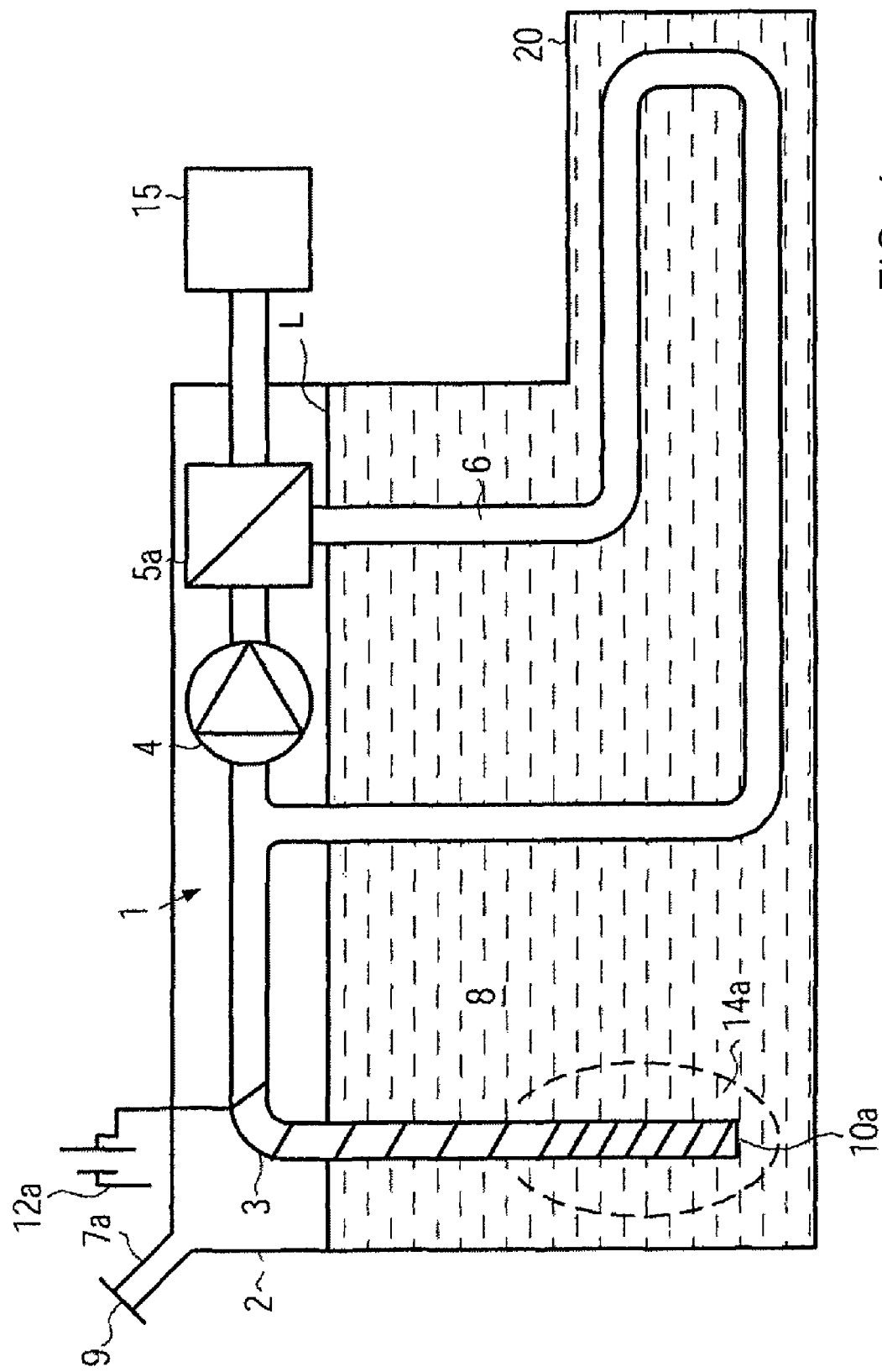
FIG. 4 shows a schematic representation of a fourth embodiment of the invention differing from the preceding embodiments by a tank withdrawal system arranged in the tank.

FIG. 4 shows another embodiment, wherein the same reference numerals have been used for elements that correspond to the embodiments of the preceding figures as concerns their function and structure. To keep the description short, the differences to the embodiments of the already described figures are discussed.

FIG. 4 shows the tank withdrawal system 1 according to the invention, wherein the pump 4 and the valve 5a are arranged within the vehicle tank 2. Due to the fact that in this embodiment all elements of the tank withdrawal system 1, except for the last section of the withdrawal conduit 3 leading to the consumer, are arranged within the vehicle tank 2, heat losses of these elements remain in the vehicle tank, and the energy supplied to the tank withdrawal system 1 is utilized even more efficiently.

Figure 5:
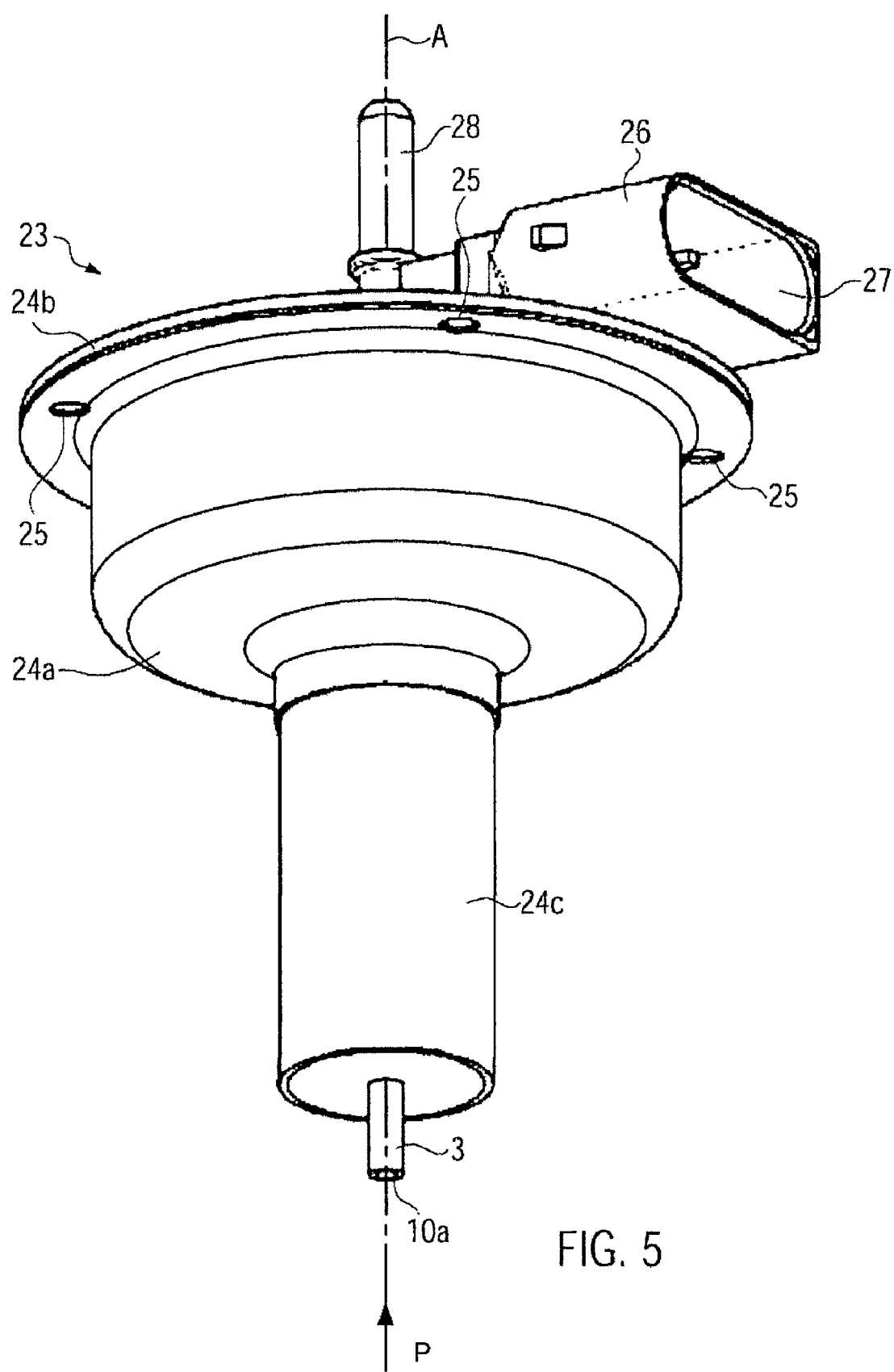
FIG. 5 shows a perspective view of a withdrawal unit of the tank withdrawal system according to the invention.

FIG. 5 shows a withdrawal unit 23 of the tank withdrawal system according to some embodiments of the invention, wherein the same reference numerals have been used for elements that correspond to the embodiments of the preceding figures as concerns their function and structure.

FIG. 5 shows an embodiment of the withdrawal unit 23. The withdrawal unit 23 comprises a housing 24 surrounding the withdrawal conduit 3. The housing 24 is constructed of three essentially rotationally symmetric parts 24a, 24b, 24c, of which the axes of symmetry are generally aligned with the axis of symmetry A of the withdrawal conduit 3. The housing 24 comprises a pot-like housing part 24a of which the cylindrical side wall extends in parallel to the axis of symmetry A. The bottom of the pot-like housing part 24a is provided with a circular recess encompassed by an edge extending to the outside and towards the withdrawal opening 10a. On the upper side of the housing part 24a, opposite the circular recess, the external wall of the housing part 24a extends to the outside, away from the axis A, and forms an opening. At the opening of the housing part 24a, the cylindrical external wall passes over into an annular area. The annular area forms a broad support surface extending perpendicularly to the axis of rotation A. The support surface is provided with circular recesses 25 into which connection elements, for example screws, can be inserted.

The housing part 24b adjoins the support surface of the pot-like housing part 24a. The housing part 24b is connected to the pot-like housing part 24a and closes its opening facing away from the withdrawal opening 10a. The housing part 24b comprises a receptacle 26 for a connector plug formed of the housing part 24b.

The receptacle 26 comprises a receptacle opening 27. A withdrawal neck 28 arranged on the surface of the withdrawal unit 23 facing away from the withdrawal opening 10a forms a section of the withdrawal conduit 3. The withdrawal neck 28 penetrates the pot-like housing part 24a along the rotational axis A.

Figure 6:
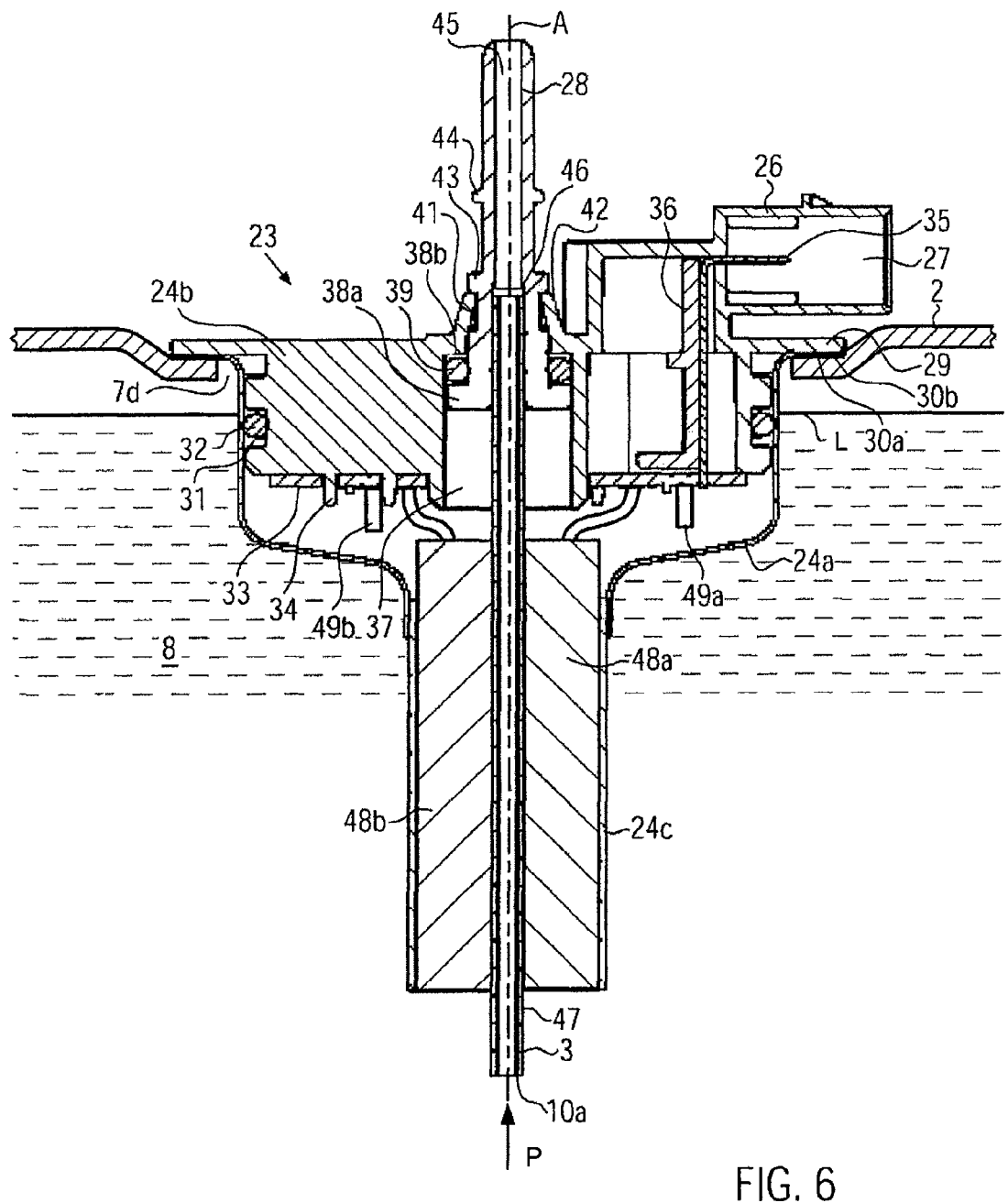
FIG. 6 shows a sectional view of a withdrawal unit of the tank withdrawal system according to the invention.

FIG. 6 shows a sectional view of the withdrawal unit 23, wherein the same reference numerals have been used for elements that correspond to the elements of the embodiments of the preceding figures as concerns their function and structure. The withdrawal unit 23 is inserted in the vehicle tank 2 through a mounting port 7d and is immersed in the liquid 8 when the vehicle tank 2 is filled. The housing part 24b of the withdrawal unit 23 has a generally cylindrical shape. The housing part 24b is inserted in the pot-like housing part 24a, wherein the cylindrical outer surface of the housing part 24b adjoins the cylindrical inner surface of the pot-like housing part 24a. An extension 29 extends from the cylindrical outer surface of the housing part 24b to the outside on the side of the housing part 24b facing away from the withdrawal opening 10a. The extension 29 forms a support surface 30b which is lying against the support surface 30a of the pot-like housing part 24a. At the cylindrical outer surface of the lid-like housing part 24b, a recess 31 is provided in which an annular sealing 32 is inserted. The sealing 32 seals the housing 24 from outside.

A printed circuit board 33 adjoins on the bottom side of the housing part 24b and is connected to the housing part 24b via fastening elements 34. The printed circuit board 33 containing at least a portion of the control electronics is connected to several successive conductors 35 in an electrically conductive manner, the conductors extending from the printed circuit board 33 to the receptacle opening 27 of the receptacle 26. In the receptacle opening 27, the conductors 35 form connecting contacts via which the printed circuit board 33 can be connected to the vehicle's electronics. The surfaces of the conductors 35 essentially facing the axis of rotation A adjoin a support element 36 which is inserted in the housing part 24b with a positive fit. The support element 36 stabilizes the conductors 34 when these are loaded during the insertion of a connector plug into the receptacle opening 27.

The withdrawal neck 28 is held in a recess 37 of the housing part 24b with a positive fit. At its end facing towards the withdrawal opening 10a, the withdrawal neck comprises a shoulder 38a at its outer surface on which an annular sealing 39 rests. The sealing 39 rests in the recess 37 on a shoulder 38b opposite the shoulder 38a. If the withdrawal neck 28 is loaded starting from the withdrawal opening towards the axis A, the shoulder 38a transmits the load via the sealing 39 to the housing part 24b. Above and below the sealing 39, the withdrawal neck 28 is guided with cylindrical outer surfaces in a section of the recess 37 with cylindrical inner surfaces.

Above the sealing 39, a clearance 41, in which several elastic snap elements 42 formed from the housing part 24b engage with a positive fit, adjoins the cylindrical outer surface of the withdrawal neck 28. The elastic snap elements 42 arranged at the outer side of the housing part 24b face away from the withdrawal opening 10a and adjoin the surface of the shoulder 43 extending vertically to the axis A. Above the shoulder 43, the outside diameter of the withdrawal neck 28 tapers. The clearance 41 and the snap elements 42 form a snap connection via which the withdrawal neck 28 is held in the housing part 24b. To connect the withdrawal neck with the housing part 24b, the same is inserted into the recess 37 along the axis A from the side of the withdrawal opening 10a, 10b.

Another shoulder 44 on the outer side of the withdrawal neck 28 is provided to fix a connection hose on the withdrawal neck 28 in a non-positive fit. In the withdrawal neck 28, a continuous cylindrical recess 45 is provided which tapers at an internal shoulder 46 towards the fluid path P. In the section of the recess 45 comprising the larger internal diameter, a withdrawal pipe 47 is inserted the outer surface of which adjoins the inner surface of the recess 45.

The housing part 24c surrounds the lower part of the withdrawal conduit 10a, 10b projecting from the housing part 24a. The cylindrically shaped housing part 24c is inserted in the recess of the housing part 24a, its cylindrical outer surface adjoining the cylindrical inner surface of the edge surrounding the recess of the housing part 24a. The lower section of the withdrawal pipe 47 projects from the housing part 24c at the end at which the withdrawal opening 10a is located. A housing wall of the housing part 24c facing towards the withdrawal opening 10a and extending generally perpendicularly to the axis of symmetry A adjoins the outer surface of the withdrawal pipe 47 and thereby seals the cavity enclosed by the housing part 24c from the surrounding area. The cavity enclosed by the housing part 24c and surrounding the withdrawal pipe 47 provides space for PTC heating elements 48a, 48b to heat the withdrawal conduit 3 and the printed circuit board 33 arranged above the cavity. In this cavity, resistance wires or thick film heaters can be alternatively arranged.

For switching the heating elements 48a, 48b, metal oxide semiconductor field effect transistors (MOSFET) 49a, 49b, are provided on the printed circuit board. To improve heat conduction of the heat dissipated by the MOSFETs 49a, 49b into the liquid 8, these are arranged in direct proximity to the housing wall of the housing part 24a adjoining the liquid 8. The housing wall of the housing part 24a thus functions as heat bridge to conduct heat dissipated by the MOSFETs 49a, 49b into the liquid 8. To further improve heat conduction from the MOSFETs 49a, 49b to the liquid or to the withdrawal conduit 3, the MOSFETs 49a, 49b can also be connected with the housing wall of the housing part 24a or the withdrawal conduit 3 via a heat conductor, for example an aluminum plate.

For switching heating elements 48a, 48b of various heating powers or for switching a different number of heating elements 48a, 48b, a greater or smaller number of MOSFETs 49a, 49b can be correspondingly used. If, for example, the heating power of the shown embodiment is doubled, instead of the shown two MOSFETs 49a, 49b, four of them can be arranged on the printed circuit board 33.

By the arrangement of the printed circuit board 33 directly at the withdrawal conduit 3, the transfer of the heat generated in the control electronics to the withdrawal conduit 3 and the liquid 8 in the vehicle tank 2 is intensified. A non-depicted heat bridge between the control electronics and the withdrawal conduit 3 connects the control electronics with the withdrawal conduit 3 in a heat conducting manner. This heat conducting connection offers the advantage that the heat formed in the electric components arranged on the printed circuit board 33 can be directly utilized for heating the withdrawal conduit 3. In the assembled state, the housing part 24a is at least partially below the fluid level L, so that the heat dissipated by the electronics can also be directly dissipated to the liquid 8 in the vehicle tank 1. By combining the withdrawal conduit 3 and the printed circuit board 33 in a housing 24 with heating elements, the heating elements can moreover heat the electric components arranged on the printed circuit board 33.

Such a combination of electric components, one or more conduits as well as of heating elements in one unit can alternatively also be provided at the heating conduit 6 or the return conduit 16, respectively.

Alternatively, indentations and/or bulgings can be provided in the outer wall of the vehicle tank 2 in which the control electronics and/or external sections of the conduit system and/or the pump 4 and/or the valve 5a can be inserted such that the dissipated heat of these elements can be at least partially absorbed by the vehicle tank 2. Alternatively or in addition to the indentations, the vehicle tank 2 can be provided at its outer side with a thermal or heat insulation reducing heat losses to the surrounding area and/or transferring heat losses of the elements located outside the vehicle tank 2 to the vehicle tank 2.

The heating elements 12a, 12b, 13, 18a, 18b, 18c, 22 shown in FIG. 1 to 4 can be operated by a non-depicted electric source of energy, for example a battery or the generator of the vehicle. They can be designed, for example, as self-regulating PTC heating elements.

Alternatively, the heating elements can be designed as resistance wires or thin film elements. To avoid exceeding a predetermined limit temperature, the heating power can be limited. In a further embodiment, a thermo regulator or an electronic control can be provided for controlling the heating power, which prevents exceeding a pre-adjusted temperature in the heating element or in the liquid adjacent to the heating element by reducing the heating power or switching off the heating elements.

The invention claimed is:

1. A tank withdrawal system for a vehicle tank adapted to store a liquid, the tank withdrawal system comprising a heating system and a conduit system, the heating system comprising at least one electric heating element and a secondary heating device, the conduit system comprising at least one withdrawal conduit with a withdrawal opening, the withdrawal opening configured to be positioned in the vehicle tank, the at least one electric heating element adapted to melt a cold start volume of the liquid extending around the withdrawal opening, the conduit system further comprising at least one heating conduit which is adapted to be passed through by a heating fluid and which is configured to be positioned in the liquid in the vehicle tank, and that the heating conduit is connected to the withdrawal conduit in a liquid conveying manner such that molten liquid serving as heating fluid is fed to the heating conduit through the withdrawal conduit, and a withdrawal unit with a housing configured to be inserted into the vehicle tank through a mounting port in one piece and to be immersed at least partially into the liquid contained in the vehicle tank, wherein the withdrawal unit comprises a section of the withdrawal conduit comprising a withdrawal opening and electric heating elements.

2. The tank withdrawal system according to claim 1 wherein the heating conduit comprises a return conduit comprising a return opening, the return opening positioned in the vehicle tank and adapted to return liquid withdrawn through the withdrawal conduit to the vehicle tank.

3. The tank withdrawal system according to claim 1 wherein the heating conduit and the withdrawal conduit form a fluid circuit via the liquid in the vehicle tank.

4. The tank withdrawal system according to claim 1 wherein both ends of the heating conduit are connected to the withdrawal conduit in a liquid conveying manner.

5. The tank withdrawal system according to claim 1 wherein the heating conduit and the withdrawal conduit form a closed circuit for the heating fluid.

6. The tank withdrawal system according to claim 1 further comprising at least one pump connected to the withdrawal conduit and positioned between the withdrawal opening and the heating conduit.

7. The tank withdrawal system according to claim 1 further comprising a valve positioned between and coupled to the withdrawal conduit and the heating conduit.

8. The tank withdrawal system according to claim 6 wherein the at least one pump includes a pump heater.

9. The tank withdrawal system according to claim 7 wherein the valve includes a valve heater.

10. The tank withdrawal system according to claim 1 wherein the withdrawal conduit and/or a return conduit and/or the heating conduit are configured to be heated.

11. The tank withdrawal system according to claim 6 wherein the at least one pump is positioned in the vehicle tank and connected to the withdrawal conduit and/or the heating conduit via a heat bridge.

12. The tank withdrawal system according to claim 7 wherein the valve is positioned in the vehicle tank and connected to the withdrawal conduit and/or the heating conduit via a heat bridge.

13. The tank withdrawal system according to claim 1, further comprising a control electronics for controlling the tank withdrawal system, wherein the control electronics is arranged in the vehicle tank and connected to the withdrawal conduit and/or the heating conduit and/or the liquid in the vehicle tank via a heat bridge.

14. The tank withdrawal system according to claim 13, wherein the section of the withdrawal conduit comprises the control electronics.

15. The tank withdrawal system according to claim 1, further comprising at least one movably driven swirling device positioned in the vehicle tank.

16. The tank withdrawal system according to claim 15 wherein the at least one movably driven swirling device is positioned in the cold start volume and/or proximate to a return opening of the heating conduit.

17. A tank withdrawal system for a vehicle tank adapted to store a liquid which is susceptible to freezing under low temperature conditions, the tank withdrawal system comprising:
at least one withdrawal conduit with a withdrawal opening configured to be positioned in the vehicle tank;
at least one electric heating element coupled to the at least one withdrawal conduit and adapted to melt a cold start volume of liquid around the withdrawal opening of the withdrawal conduit during operation;
at least one heating conduit which is configured to be positioned in the vehicle tank, the heating conduit connected to the withdrawal conduit in a liquid conveying manner such that molten liquid from the vehicle tank is able to be fed to the heating conduit through the withdrawal conduit and return to the vehicle tank to supply heat thereto; and
a withdrawal unit with a housing configured to be inserted into the vehicle tank through a mounting port in one piece and to be immersed at least partially into the liquid, contained in the vehicle tank, wherein the withdrawal unit comprises a section of the at least one withdrawal conduit comprising a withdrawal opening and the at least one electric heating element.

* * * * *